UNITED STATES PATENT OFFICE.

EDWARD MILNER, OF WARRINGTON, ENGLAND.

IMPROVEMENT IN THE MANUFACTURE OF WHITE LEAD.

Specification forming part of Letters Patent No. 184,947, dated November 28, 1876; application filed July 11, 1876.

*To all whom it may concern:*

Be it known that I, EDWARD MILNER, of Warrington, Lancashire, England, have invented Improvements in the Manufacture of White Lead, of which the following is a specification:

My invention relates to an improved method of manufacturing white lead (carbonate of lead) from litharge, and is a further improvement on the processes described in the specifications of Letters Patent for Great Britain granted to John Gallemore Dale and myself, the said Edward Milner, dated August 10, 1869, No. 2,443, and also to myself, the said Edward Milner, also in Great Britain, dated June 22, 1872, and numbered 1,881.

My improvements relate more especially to the patent of June 22, 1872; and consist in certain alterations discovered in the course of manufacture, by which I have been enabled to produce a carbonate of lead equal in commercial value to most of that produced by the well-known Dutch method, and of a quality far superior to that which I have found it possible to make by accurately following my former specification.

I now proceed to describe these my improvements.

I take oxide of lead—commonly known as "litharge,"—in a very finely ground state, and mix it with a solution of chloride of sodium, potassium, or ammonium, in the proportion of about four pounds dry litharge to one pound dry salt, the salt being dissolved in sixteen parts, by weight, of water. I do not consider these precise proportions essential; but they are what I find work satisfactorily. This mixture is now agitated thoroughly in a wooden pug-mill, which is best made of yellow pine, with arms of American elm, driven by suitable machinery. Oak timber must, on no account, be introduced into this vessel, or the proper reaction will not take place. The agitation should be kept up for at least three hours without ceasing, because if it is stopped the whole mass will set so stiff that it cannot be further agitated, but has to be removed by hand from the mill. After this time the mixture becomes more fluid, and only requires agitating a short time to finish the charge; but this time can only be found by actual examination of each charge. I usually work the charges for about four and a half hours. The result of this operation is an insoluble basic chloride of lead, (previously described in the specification of the Patent No. 1,881 of 1872 as hydrated oxide and chloride of lead,) and it is the equivalent of what is referred to in the specification of the patent of August 16, 1869, as being insoluble basic salts of lead. The chloride will be suspended in a solution, which will contain caustic soda and common salt when chloride of sodium is used. Up to this point I am merely setting forth the improvements made on part of the invention the subject of the patent of 1869, No. 2,443—namely, this particular way of making the insoluble basic salt of lead and effecting its combination with caustic soda in one operation. The mixture thus made is now introduced into a vessel lined with lead and fitted with wooden beaters, filling the vessel rather higher than the horizontal shaft to which the beaters are fixed, and therefore leaving some of the arms of the beaters always above the surface, so as to obtain as great an amount of agitation as possible. A stream of carbonic-acid gas is now introduced to effect the result referred to in the said patent of 1869; but it should be introduced as described in the specification of the patent of 1872—that is, near the bottom or at a low part of the vessel.

The action of the carbonic-acid gas will be much more effective, and a better result will, I find, be produced, if, instead of arresting it at the point mentioned in the said specification of the patent of 1872, it is continued beyond that point when the solution no longer gives an alkaline reaction. By thus continuing to force the current of carbonic-acid gas into the mixture for a longer time than was proposed in my former specification, varying it, according to the violence of agitation and strength of the gas, from half an hour to about three hours, the resulting carbonate of lead will be obtained of an improved character, and of far greater commercial value than what I have heretofore obtained, being denser, having more body, and working better as a pigment. Care must be taken not to continue the action of the carbonic-acid gas for too long a time, as, in that case, it would lose its value as a pigment.

I have discovered a very simple test by which any one can tell when it is necessary to cease supplying gas to the mixture. When the solution has ceased to show an alkaline reaction the mixture is a viscid homogeneous mass, and if a portion is shaken in a half-empty glass, it will coat the sides and remain in a layer all over them; but when sufficient gas has been applied, a small quantity shaken in a clear-glass vessel coats the side with a very thin layer, like frost on a window-pane, and, after standing for a few seconds, the clear liquor separates from the carbonate of lead, and leaves an arborescent pattern on the interior of the glass. If, however, the action of the gas is continued for too long a time, the product loses its value, becoming like sand, and not coating the test-glass at all, but settling rapidly out of the salt-solution. The workmen can tell by this simple test, to the greatest nicety, when to stop the supply of gas.

The carbonate of lead thus produced, after being washed to free it from salt, and being dried, is ready for use, and is of greatly improved quality as compared to that produced by the former methods, as previously described.

Having now described my invention, and the best means I am acquainted with for carrying the same into effect, I claim—

The herein-described process of manufacturing carbonate of lead, which consists in subjecting a mixture of litharge and the chloride of sodium, potassium, or ammonium to the action of carbonic-acid gas, and continuing the flow of gas after alkaline reaction has ceased, substantially as and for the purpose set forth.

EDWARD MILNER.

Witnesses:
CHARLES ROBERTS,
JAS. BOLTON.